United States Patent [19]

Wyman et al.

[11] 4,270,164
[45] May 26, 1981

[54] SHORT CIRCUIT PROTECTION FOR SWITCHING TYPE POWER PROCESSORS

[75] Inventors: Kenneth R. Wyman; Gerard A. Gallagher, both of Pittsburgh, Pa.

[73] Assignee: Contraves Goerz Corporation, Pittsburgh, Pa.

[21] Appl. No.: 16,187

[22] Filed: Feb. 28, 1979

[51] Int. Cl.³ .......................................... H02M 7/122
[52] U.S. Cl. ...................................... 363/56; 318/635
[58] Field of Search .................. 318/563, 635; 361/31; 363/55–58, 98, 132

[56] References Cited

U.S. PATENT DOCUMENTS

| 3,733,537 | 5/1973 | Kernick et al. | 363/56 |
| 3,733,538 | 5/1973 | Kernick et al. | 363/58 |
| 4,037,715 | 7/1977 | Wyman et al. | 323/4 |
| 4,126,819 | 11/1978 | Stobbe et al. | 363/132 |

FOREIGN PATENT DOCUMENTS 2753722 6/1979 Fed. Rep. of Germany ............ 363/58

Primary Examiner—William M. Shoop
Attorney, Agent, or Firm—Robert D. Yeager; Andrew J. Cornelius

[57] ABSTRACT

A power processor having a switching type output is provided with protection against short circuit current flow. A transformer is provided with the primary windings connected in series with the main current flow path. The secondary transformer windings have a voltage signal induced therein which is indicative of a rapidly rising short circuit current flow. A threshold detector connected to the output from the secondary windings determines when the voltage signal from the secondary windings exceeds a predetermined value. The signal from the threshold detector is used to activate over current protection circuitry which shuts down the output switching devices and prevents the occurrence of large short circuit currents.

12 Claims, 6 Drawing Figures

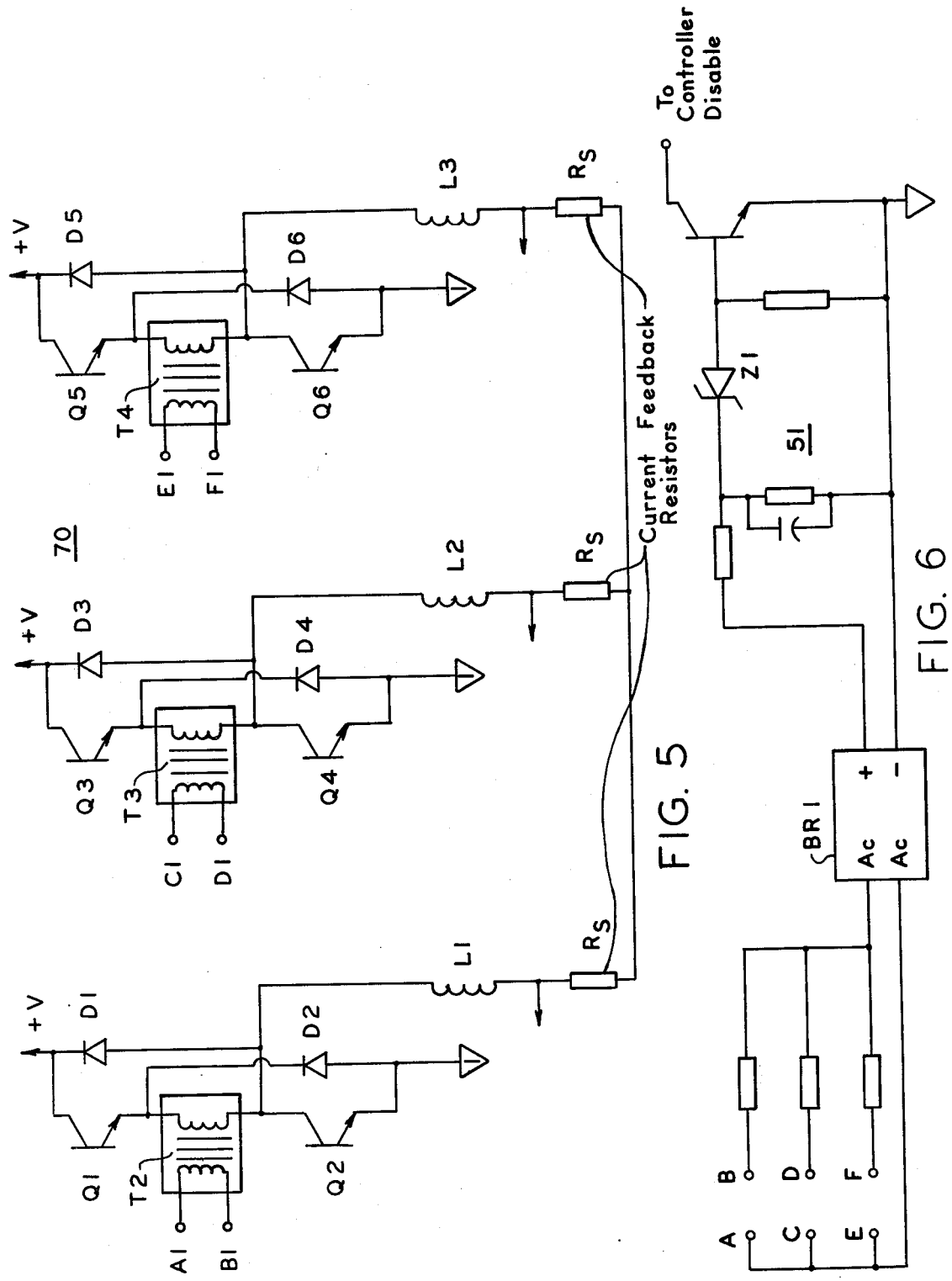

SHORT CIRCUIT PROTECTION FOR SWITCHING TYPE POWER PROCESSORS

BACKGROUND OF THE INVENTION

1. Field of the Invention

This invention relates to current limiting and more particularly to the rapid limiting of short circuit current flow in the output of a switching type power processor.

2. Description of the Prior Art

Prior art switching type devices either do not incoporate protection against over current conditions, or have over current sensing circuits that employ basically resistive sensing devices and that respond only after excessive current levels have been attained in the circuit.

SUMMARY OF THE INVENTION

This invention teaches a power controller which utilizes a switching type power output stage having short circuit current protection for the output switching devices. The switching type power controller to which the invention is applicable is of the type described in U.S. Pat. Nos. 3,294,981 and 4,035,715 whose teachings are hereby incorporated by reference.

The output stage of the disclosed power processing unit is normally connected in a bridge configuration. The disclosed circuit prevents the flow of potentially destructive currents when the output load terminals are shorted together or when either is connected to common. A transformer is provided having primary windings disposed so that short circuit currents and voltages will be monitored thereby. Inductively coupled to the primary sensing windings are secondary windings in which a signal proportional to the primary voltage and currents is induced. The secondary winding signal is utilized to turn off the power section of the controller before destructive fault currents can flow therethrough. The inductance of the primary current sensing windings is sufficient to allow operating time for the protection circuit.

In one embodiment of the invention first and second primary windings are connected in series on either side of an inductive load connected to the bridge configured output. Inductance of either one of these primary windings is sufficient to allow only a given rate of current rise, di/dt, when the load is short circuited, or when an output terminal is shorted to common. A secondary winding is inductively coupled to the first and second primary windings and provides an output signal which can be used to turn off the power section of the controller in the event of a short circuit. The inductance of the primary windings is calculated to allow sufficient operating time for the protection circuit before destructive currents can flow.

In another embodiment of the invention the two primary sensing windings are provided in opposite upper legs of the bridge configured output. That is, the primary windings are connected in the legs of the bridge configured output which are connected to the power supply. This provides additional protection for some of the output switching devices and allows the controller to shut down when one output switching device fails without destroying the other output switching devices.

This overcurrent protection can also be provided on a multi-phase drive application. In the multi-phase application separate transformers are utilized with the primary of one of the transformers connected in one leg of the output section. Secondary windings have a signal induced in them in the event of a short circuit in any one phase. The secondary winding outputs from the transformers are connected to the input of a full wave bridge rectifier whose DC output can be utilized for determining potential overcurrent flow and initiating shut down of the power output section.

It is an object of this invention to teach an overcurrent protection circuit for a switching type power controller which detects the potential for short circuit current flow in the power output stage and shuts down the power output switching devices before short circuit current reaches a destructive level.

BRIEF DESCRIPTION OF THE DRAWINGS

For a better understanding of the invention, reference may be had to the preferred embodiments, exemplary of the invention shown in the accompanying drawings in which:

FIG. 5 shows the output stage of a multi-phase power processor having short circuit current protection; and, FIG. 6 is a detection circuit utilized with the output from the short circuit current sensing transformers utilized in FIG. 5.

DESCRIPTION OF THE PREFERRED EMBODIMENTS

Figure 1:
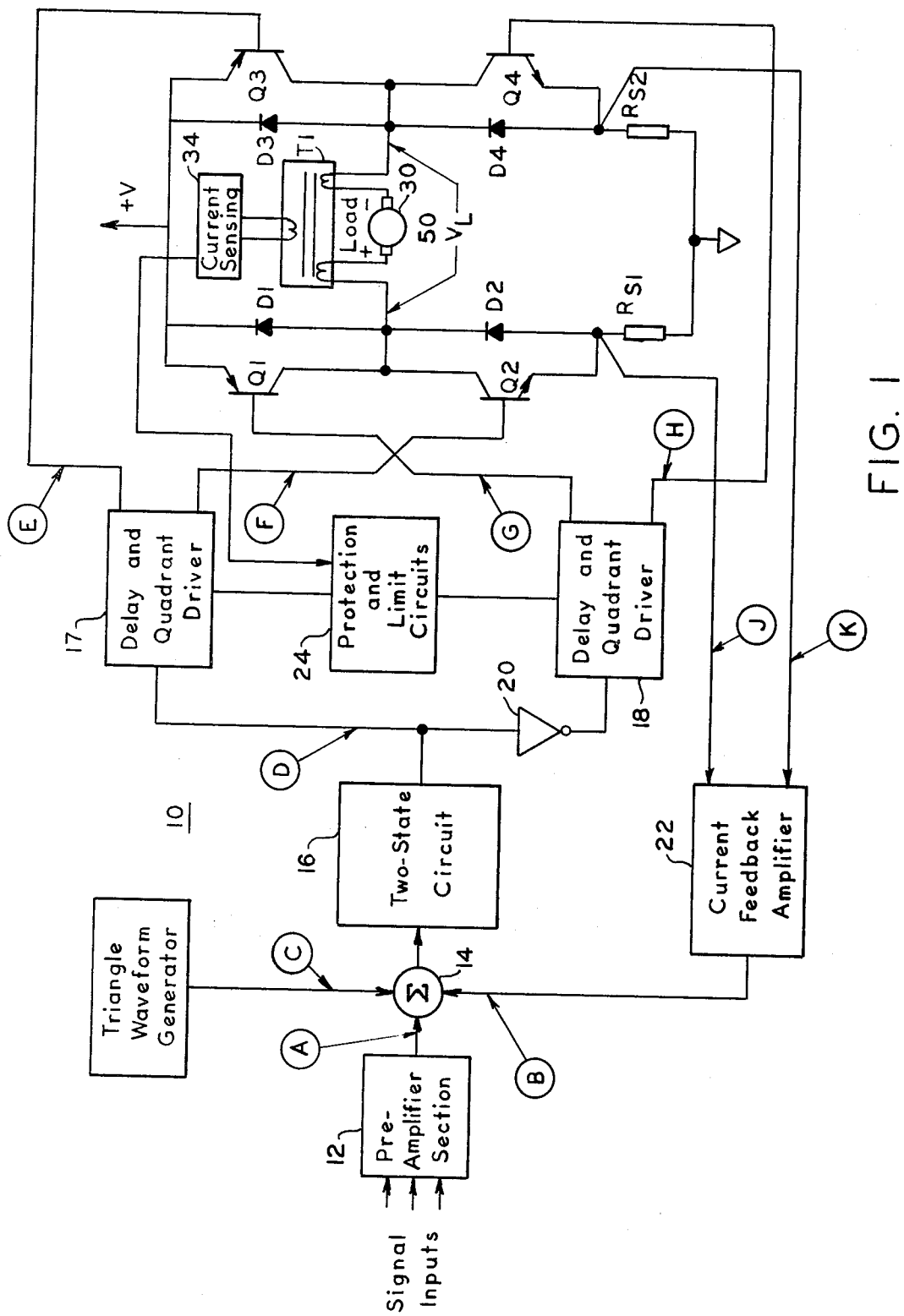
FIG. 1 is a simplified block diagram of a servo controller utilizing the teaching of the present invention having short circuit current protection for the output power bridge section.
Figure 2:
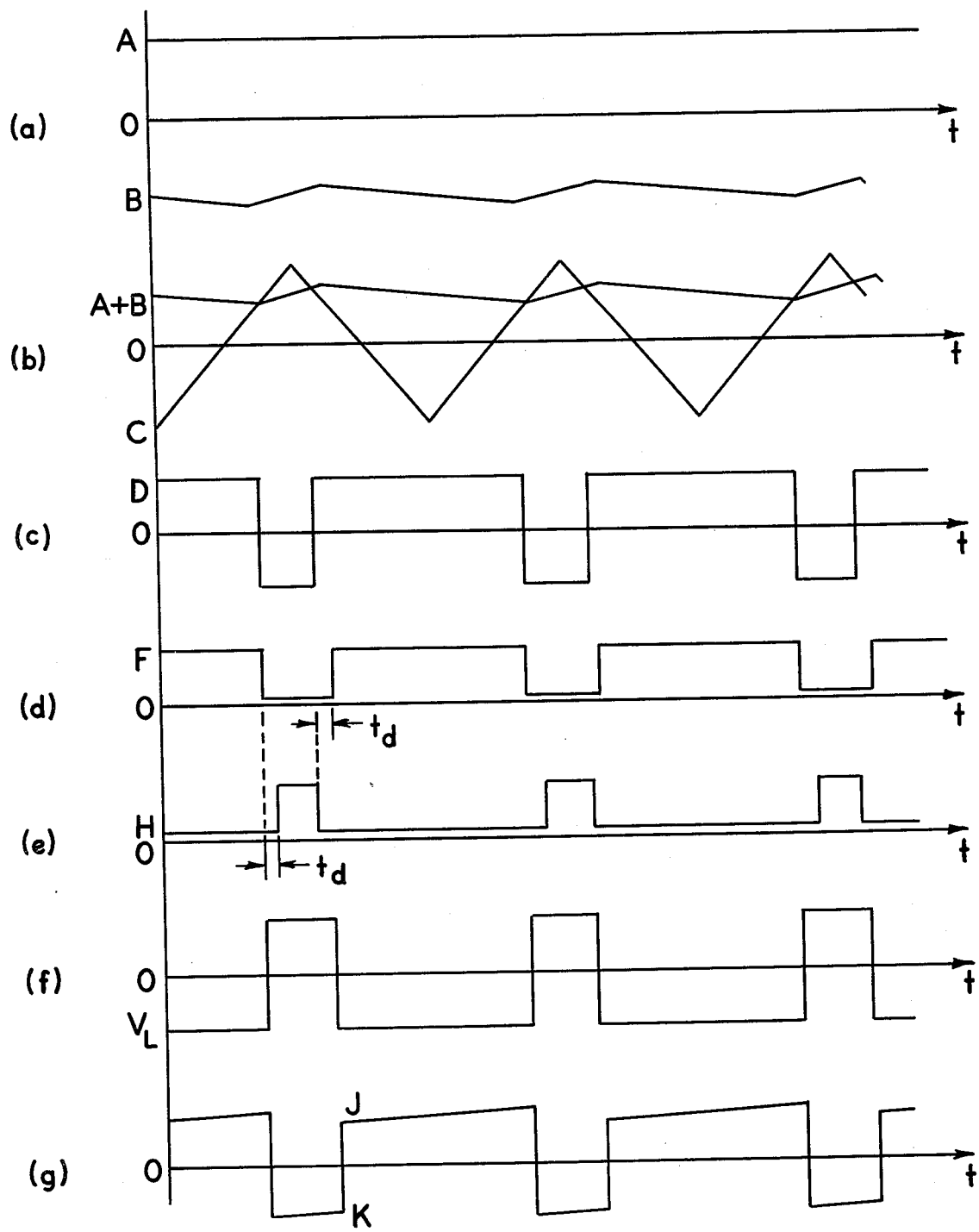
FIGS. 2a-2g illustrate a set of idealized wave forms that appear at various points in the controller shown in FIG. 1.

Referring now to the drawings and more particularly to FIGS. 1 and 2 there is shown a servo controller 10 utilizing the teaching of the present invention. Servo controller 10 is a switching mode controller in which the power semiconductors Q1 through Q4, are either in saturation or cut-off. This results in highly efficient controller operation since very little power is dissipated within the semi-conductors in either of these two states. Power transistor switches Q1 through Q4 are utilized as the output switching semi-conductors in servo controller 10. This results in less complicated output circuitry and a more refined and predictable control of load power than is obtainable with some other switching devices, such as silicon controlled rectifiers.

Servo controller 10 utilizes the switching technique commonly known as two state modulation, which is described fully in U.S. Pat. No. 3,294,981. The two state modulation technique utilized for DC motor contol has advantages over other switching techniques, such as pulse width modulation (PWM).

Functioning of the various circuits of controller 10 can be understood by referring now to the drawing of FIG. 1 which is partially in block diagram form. Initially incoming signals are processed by a preamplifier section 12, where servo compensation normally takes place. Preamplifier section 12 can be utilized to sum velocity command and tachometer feedback signals and provide the necessary servo compensation and adjustment which result in stable, optimum servo operation. A resulting signal, A, from the preamplifier section is then combined algebraically with the feedback signal, B, which is representative of the current flowing in the load and a relatively high frequency triangular waveform signal, C. The combining is accomplished at summing junction 14. The resulting error signal at the output of summing junction 14 is applied to a two-state circuit. The output of the two-state circuit is a square wave signal, D, having the appropriate pulse width and frequency modulation characteristics for the particular load and command condition. Signal, D, is divided at the output of the two-state circuit 16. The output of the two state circuit 16 is applied to identical delay and quadrant driver circuits 17 and 18. Delay and quadrant driver circuits 17 and 18 contain delay and driver circuitry as well as interfacing circuitry for the protection and limit circuits 24. An inverter 20 is provided to invert signal D before it is applied to delay and quadrant driver 18. The inversion provided by inverter 20 is necessary to provide proper signal phasing in the output section.

The output section 50 is a bridge, shown in simplified form in FIG. 1, consisting of parallel output transistors and faster acting free-wheeling diodes in each quadrant. For simplicity only one transistor per quadrant is shown in FIG. 1 although in actual practice many parallel output parallel transistors may be utilized. Emitter resistors, whose use is more fully explained in U.S. Pat. No. 4,035,715 are employed with each output transistor to enhance current sharing. Some aspects of the operation of servo controller 10 are more fully described in the Operating and Service Manual for NC400 Series Servo Controller manufactured by Control Systems Research, Inc., 632 Fort Duquesne Blvd., Pittsburgh, PA 15222. The teachings of the Operating and Service Manual for NC400 Series Servo Controller are hereby incorporated by reference.

Unlike linear amplifiers, where a small idling or common mode current is necessary to eliminate cross over distortion, common mode conduction or switch through must be avoided in switching amplifiers. Common mode or switch through condition may arise because of unequal turn on and turn off times of the transistors Q1 through Q4. The turn off time of transistors Q1 through Q4 is longer than the turn on time. In servo controller 10 precise turn on delay times are provided in the delay and quadrant driver circuit sections 17 and 18 so that, for example, Q1 has sufficient time to turn off before Q2 is allowed to turn on.

The use of the bridge output section 50 in the servo controller 10 provides for full four quadrant dynamic motor operation. Hence, controller 10 is capable of not only delivering power to motor 30 but also of removing regenerative power from motor 30 during period of deceleration.

Load current in the bridge output section 50 flows through Q1-load 30-Q4 or through Q3-load 30-Q2. That is, common conduction is always diagonal in the bridge output 50. The destructive condition of having Q1 and Q2 or Q3 and Q4 on simultaneously is prevented by appropriate low level logic circuitry.

Load current is sampled by resistors RS1 and RS2 in each leg of the bridge circuit 50. The resultant signals J and K from the sampling resistors RS1 and RS2 are combined differentially by current feedback amplifier 22. The output of current feedback amplifier 22 is a signal B which is representative of the actual armature current for load 30. The current feedback loop provided through current feedback amplifier 22 provides servo controller 10 with several advantages. First, precise adjustable current limiting is achieved by limiting the peak voltage magnitude at point A. Second, the current feedback configuration makes the amplifier appear to the load as a controlled current source; thus the effect of the motor L/R time constant is substantially reduced. This is especially desirable in high response servo drive applications. Finally the effect of low armature resistance or variations of armature resistance due to heating will not impair the performance of the servo controller 10.

Servo controller 10 includes protection and limit circuits 24. Protection and limit circuits 24 function to protect servo controller 10 from conditions that if left unchecked, could cause catastrophic damage. Some of the various protection circuits are described more fully in U.S. Pat. No. 4,035,715. Controller 10 can include a thermal sensor which is attached to heat sinks utilized in the controller. A thermal sensor is intended primarily to sense loss of fan cooling or excessively high ambient temperatures. The current feedback signal, representative of armature current, is fed to an electronic circuit breaker which senses and disables the controller 10 when current above the rated current for the controller is being outputed to the load 30. After operating a given time at the excessive level, the controller is shut down. The controller can also include an over voltage sensing circuit to detect an excessively high DC bus condition and act to disable the controller. Controller 10 may also include under voltage protective circuits for monitoring the DC bus and the 15 volt DC bias voltage.

Servo controller 10 also contains two over current sensing circuits. The primary short circuit current sensing circuit employs the principle of inductive voltage division and the transformer effect to sense potentially catastrophic conditions, such as a grounded short to the armature of the load 30. The primary over current protection circuit consists of a special transformer T1. Transformer T1 contains two identical primary windings and a secondary winding that is connected to current sensing circuitry 34. The primary windings are designed to have sufficient inductance, so that the rate of rise of current, should the entire bus voltage be placed across it, will be low enough to allow sufficient time for the controller to disable itself.

Under normal conditions of operation, the load inductance will be many times large than either of the primary windings of the special transformer T1. One primary winding is placed between each output of the controller and the load 30. Most of the voltage appears across the load inductance, and hence very little voltage is induced in the secondary winding of T1. When a short circuit occurs, most of the voltage appears across one or both of the primary windings, which induces a proportionally larger voltage in the secondary of T1. This higher secondary voltage is sufficient to exceed the threshold level in the current sensing circuit and the protection and limit circuit 24 is activated to disable controller 10.

Controller 10 may also include a secondary over current sensing circuit which monitors the voltage drop across the emitter resistors of transistors Q1 and Q3. If the primary over current sensing circuit should fail to recognize the potentially catastrophic over current condition, or if an internal short circuit should develop within the controller, the secondary over current circuit will sense the condition and disable controller 10. The secondary over current sensing circuit is not as fast acting as the primary current sensing circuit and a higher than peak current must appear in the emitter resistors being monitored before any action is taken to disable controller 10.

Referring now to FIG. 2 there is shown a set of idealized waveforms that appear at various points in the controller 10 represented in FIG. 1. The waveforms are not to scale and certain waveforms have been exaggerated for clarity. The waveforms are however in proper time sequence. The waveforms of FIG. 2 are for a specific case of input excitation, namely a DC level at point A. FIG. 2(a) depicts the input command signal appearing in point A in FIG. 1 and the feedback signal B representing the current flow in load circuit 30. The two signals at points A and B are combined with the triangular waveform at point C as shown in FIG. 2(b) at summing junction 14. For clarity, signals at points A and B are shown combined, and their sum is plotted against the triangular waveform at point C. The resulting waveform from summing junction 14 when applied to two state circuit 16 produces a waveform at point D which is shown in FIG. 2(c). This waveform contains the pulse width and frequency modulation information required to satisfy the input and load conditions at any instance of time. Waveform D when applied to the delay and quadrant driver sections 17 and 18 produces the necessary drive signals at points E, F, G and H for the controller's output switching transistors Q1 through Q4. FIGS. 2(d) and 2(e) depict the two lower quadrant drive signals at points F and H. The two upper quadrant signals at points E and G are not shown since they are similar, when shown with respect to +V, to F and H respectively. FIGS. 2(d) and (e) note the effect of the delay times $t_d$ on waveforms F or H. After either F or H goes to zero a delay time $t_d$ is provided before H or F, respectively, goes on. This slight delay $t_d$ ensures that common-mode conduction in the output section does not occur.

FIG. 2(f) shows the load voltage $V_L$. The effect of the delay times $t_d$ is not apparent in $V_L$ because an inductive load such as a motor will cause current to free wheel through diodes D1, D4 and D2, D3. Therefore, when Q2 and Q3 are turned off, the load voltage abruptly changes polarity despite the fact that Q1 and Q4 have not yet been turned on.

In FIG. 2(g) waveforms J and K represent the two constituent parts of the load current, transistor and diode, sampled by identical resistors RS1 and RS2. These signals are added differentially and scaled to form waveform B of the current feedback signal. As can be seen in FIG. 2(b) if the virtual combined signal A+B were large enough to exceed the peak value of the triangular signal C the controller would cease to switch at a rate determined by the period of the triangular waveform C. For this period of time the output would no longer be pulse width modulated. In the disclosed servo controller 10 this is used to advantage to provide a better dynamic response and higher motor speeds than obtainable with the PWM approach. Greater than 100% modulation allows the load current during transient intervals to slew at a rate limited only by the load circuit parameters.

Figure 3:
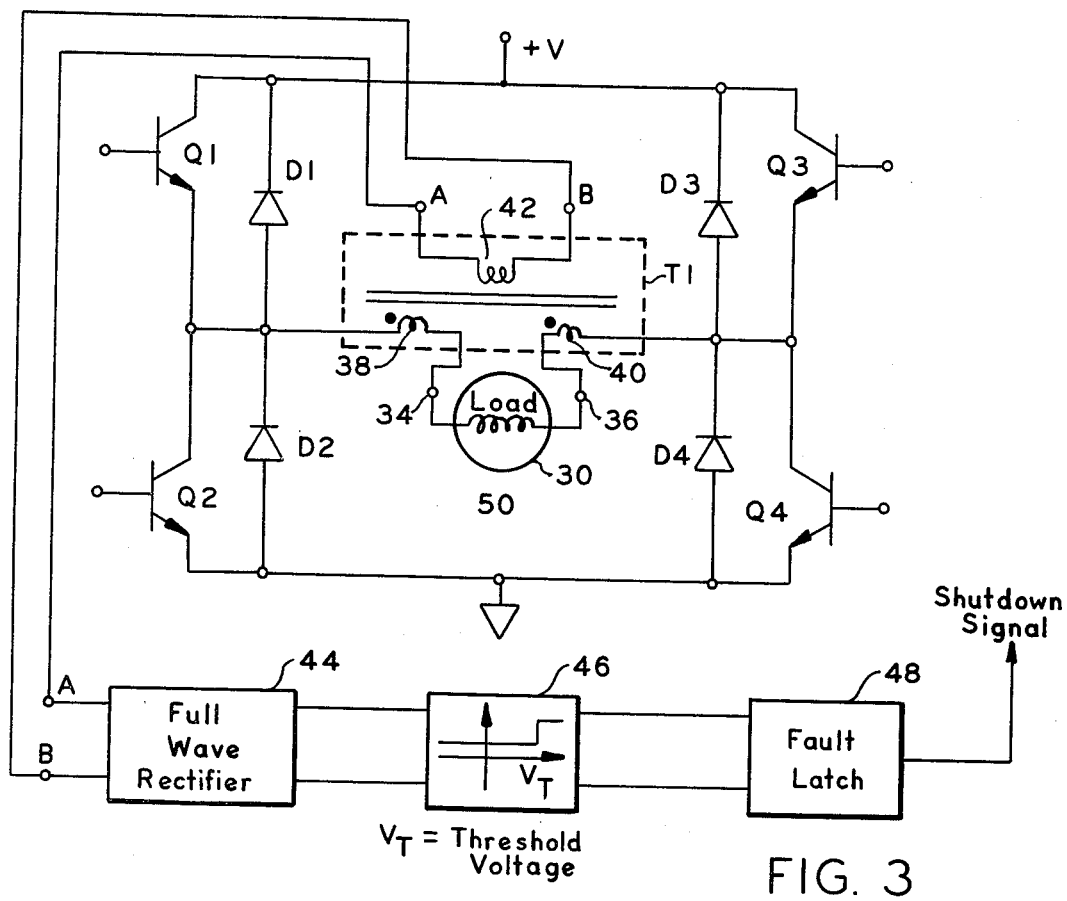
FIG. 3 is a more detailed representation of the output bridge circuit used with the controller of FIG. 1.

Referring now to FIG. 3 there is shown a bridge connected output 50 for a switching type servo controller 10 as shown in FIG. 1. The bridge connected output 50 has over current protection against high short circuit currents. Load terminals 34 and 36 are provided for connection to an inductive output load such as motor 30. The circuit protects controller 10 from the flow of potentially destructive currents when either load connection terminal 34 or 36 is connected to common or when terminals 34, 36 are connected together. Transformer T1 has a pair of primary windings 38 and 40 which are connected in series on opposite sides of load 30. Transformer T1 includes a secondary winding 42 which has a signal induced therein that is representative of current flow through primary windings 38 or 40.

When the output terminals 34 and 36 are connected together or to a common a signal is generated in secondary winding 42 which can be processed and used to turn off the power switching devices Q1 through Q4 of controller 10 thus limiting the magnitude of the fault current. Motor load 50 has an inductance that is present as part of the equivalent load circuit. The value of the load inductance is normally greater than the total inductance of the two sensing circuit windings 38 and 40. The inductance of either of the sensing windings 38, 40 is sufficient to allow only a given rate of current rise di/dt, when one load terminal is shorted to common. The rate of current rise and hence inductance L is calculated to allow sufficient operating time for the protection circuit, on the order of 10 to 15 microseconds.

During normal operation voltage division occurs among the inductances in the output circuit and a voltage of given magnitude is induced in winding 42. The outputs AB of winding 42 are connected to a full wave bridge rectifier 44. The output of full wave rectifier 44 is fed to a threshold detector 46 which is set to ignore normal current flow. Upon the occurrence of the fault condition a higher voltage is induced in winding 42 and the output of the full wave rectifier bridge 44 will be above the predetermined level set in threshold detector 46 to activate fault latch 48. Activating fault latch 48 disables switching output stage 50. Fault latch 48 can be momentary or maintained. If momentary, fault latch 48 will automatically be reset and allow normal operation to resume if the cause of the fault condition has been cleared. If fault latch 48 is maintained, the controller will be maintained in the off state until manually reset.

Figure 4:
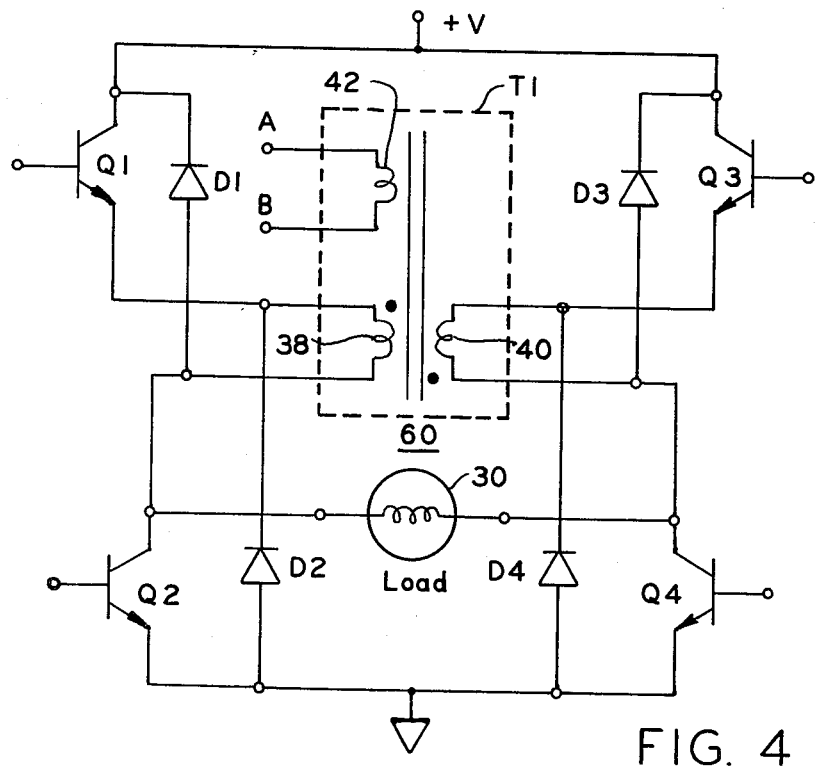
FIG. 4 is a schematic of a bridge output section of a switching power controller utilizing another embodiment of the invention for short circuit current protection.

Referring now to FIG. 4 there is shown another embodiment of an output section 60 having overcurrent protection. Operation of the circuit of FIG. 4 is similar to the circuit of FIG. 3. However, the circuit of FIG. 4 provides some additional protection for switching devices Q1 through Q4. In the circuit of FIG. 3, if for any reason, devices Q1 and Q2 or Q3 and Q4 should conduct simultaneously, a potential for destructive current flow is established. This condition is normally disallowed by the controller's logic, but a catastrophic failure of Q1 or Q3 could cause failure of Q2 or Q4 respectively during its next on cycle. In the circuit of FIG. 4 one of the primary windings 38 of T1 is introduced between Q1 and Q2. The other primary winding 40 of T1 is interposed between transistor Q3 and Q4. This limits the rate of current rise to a value determined by the inductance of the respective windings. This is so since, di/dt equals V/L. In addition, since virtually the entire supply voltage +V is imposed across winding 38 or 40 during a failure of transistor Q1 Q2, Q3 or Q4 a voltage is induced in winding 42 that would be of sufficient magnitude to initiate shut down of controller 10. Inductance L of winding 38 or 40 is large enough in magnitude to provide sufficient time, dt, to allow safe shut down before the current rise, di, reaches a its destructive level in the transistor switches.

The circuit arrangement of FIG. 4 allows the controller 10 to shut itself down before short circuit current destroys good transistor Q1 through Q4. If one of the transistors Q1 through Q4 fails controller 10 is shut down without destroying the transistors in the other legs of the bridge configured output 50. In the circuit of FIG. 4 the flyback diodes D1 through D4 are connected across windings 38 and 40 to clamp the voltage seen by transistors Q1 through Q4 to a safe level. Windings 38 and 40 have a small inductance associated therewith and this could cause a potentially destructive voltage spike when transistors Q1 through Q4 are turned off. Connecting diodes D1 through D4 as shown in FIG. 4 clamps any voltage spike to a safe level.

Referring now to FIGS. 5 and 6 there is shown an over current protection circuit for a three phase drive application. Over current sensing transformers T2, T3 and T4 function primarily to indicate when a potential over current will exist but also limit the rate of current rise, di/dt.

Under normal operating conditions transistor pairs Q1 and Q2, Q3 and Q4, Q5 and Q6 are never in the conducting state at the same time and therefore full bus voltage is not applied to transformer T2, T3 or T4. When normal conduction is occurring, the voltage applied to the transformer is small because of the respective low inductance relative to the load indicated by inductances L1, L2 and L3. An over current condition can exist if: (1) the motor load is short circuited, (2) the motor load is shorted to power supply common or (3) one of the output bridge transistors fails as a short.

Under any of these three conditions full voltage, +V, will be applied to the primary of one of the over current transformers T2, T3 and T4. Through transformer action the voltage induced in the secondary winding of transformer T2, T3 or T4 will rise rapidly to indicate any fault conditions. Due to the inductance in the primary of the transformer the rate of current rise will be limited to a predetermined level. This di/dt limitation affords enough time to turn off the conducting transistor before its conducted current reaches a destructive level.

The overcurrent transformers T2, T3, and T4 also promote more efficient output, transistor operation. During output transistor turn-on a high rate of voltage rise dv/dt can induce conduction in a non-conducting transistor located directly above or below the conducting transistor. With the addition of inductance between the top and bottom quadrant transistors, the common mode conduction voltage spike, dv/dt is limited in amplitude.

Referring now to the detection circuit shown in FIG. 6, when full voltage is applied to the primary of one or more of the over current transformers, T2, T3, T4 the secondary voltage across points AB, CD or EF rises rapidly to a relatively high voltage level. The bridge circuit BR1 rectifies this voltage to the correct polarity and then provides a DC output. The output of bridge BR1 is applied to a filter and voltage divider circuit 51. This output when of sufficient amplitude breaks over zener diode Z1 and activates a controller disabling circuit. During normal circuit operation, voltage present at the cathode of zener diode Z1 is not sufficient in amplitude to activate the disable circuit.

In the circuit 70 shown in FIG. 5, the positions of the overcurrent transformers T2, T3, and T4 in the output bridge necessitate the location of the free wheeling diodes D1 through D6 as shown. As connected in FIG. 5 the free wheeling diodes D1 through D6 protect the output transistors Q1 through Q6 against excessive voltage spikes generated by the inductances of transformers T2, T3 and T4, when conducting transistors are turned off. Diodes D1 through D6 clamp these voltage spikes to safe levels. Following are some actual circuits parameters for output circuit 70:

DC bus voltage≃200 VDC
Collector Currents≃65 A peak
Transformer Primary Inductance≃10 μH
Transformer Ratio=10:1
Controller Disable Time≃10 μs
Maximum Collector Current≃180 A

What is claimed is:

1. A servo controller having a switching output supplying an inductive load having protection against a short circuit current comprising:
   a bridge connected output section;
   first and second windings connected in series with the load connected to the output of the bridge connected output section;
   a third winding inductively coupled to said first and second windings to provide an output representative of the rate of current change in the first or second windings;
   a threshold detector connected to said third winding to provide a signal when the voltage induced in the third winding exceeds a predetermined value; and,
   control means responsive to said threshold detector for turning off said bridge connected output section.

2. A power processor comprising, input means for receiving input into the power processor:
   output means connected in a bridge configuration for providing an output to a load circuit from the power processor which has a characteristic of the input;
   control circuit means disposed between said input means and said output means for controlling said output means;
   said output means comprises;
      a plurality of semi-conductor switching devices connected to define a bridge;
      a transformer having a pair of primary windings, one connected on each side of the load, and a secondary winding inductively coupled to said pair of primary windings to indicate rate of change of current flow through said pair of primary windings; and,
      current sensing and limiting means connected to said secondary winding for turning off the switching semi-conductors in said output means when rate of change of current flow through said pair of primary windings exceeds a predetermined value.

3. A servo controller having a switching output, utilizing semiconductor switching devices, for supplying a load comprising:
   driver means for turning the semiconductor switching devices on or off;
   a transformer having a primary winding, connected in series with the inductive load, and a secondary winding inductively coupled to the primary winding;
   a threshold detector connected to the secondary winding of said transformer for detecting when the voltage induced in the secondary winding exceeds a predetermined value;

a current limiting means, responsive to said threshold detector, connected between said threshold detector and said driver means for controlling said driver means to turn said semiconductor switching devices off before a destructive current flow therethrough.

4. A servo controller as claimed in claim 3 wherein:
the primary winding of said transformer has sufficient inductance to limit the rate of current rise, di/dt, to allow the semiconductor switching devices to be turned off before destructive current flows therethrough.

5. A servo controller as claimed in claim 4 comprising:
a flyback diode connected around each output semiconductor switching device.

6. A servo controller having a bridge connected output (50) with over current protection comprising:
an input,
a power supply connected to the top and bottom of the bridge connected output;
a first pair of transistors (Q1, Q3) connected in the upper legs of the bridge connected output,
a second pair of transistors (Q2, Q4) connected in the lower legs of the bridge connected output;
an output (34, 36) for connecting a load across the bridge between said first pair of transistors and said second pair of transistors;
control means for selectively turning said first pair of transistors and said second pair of transistors on and off to supply an output signal representative of the signal applied to said input;
a transformer (T1) having a secondary winding (42) and a pair of primary windings (38, 40) one connected in series with each of said first pair of transistors; and,
current limiting means connected between the secondary winding and said control means for causing said control means to turn said first pair of transistors and said second pair of transistors off in response to a voltage induced in said secondary winding representative of an over current signal in at least one of said pairs of transistors.

7. A servo controller as claimed in claim 6 comprising:
a first pair of diodes (D1, D3) each connected from the top of the bridge across one of said first pair of transistors and the series connected primary winding; and,
a second pair of diodes (D2, D4) each connected from the bottom of the bridge across one of said second pair of transistors and one of the primary windings.

8. A servo controller as claimed in claim 6 wherein said current limiting means comprises:
a full wave rectifier connected to the secondary winding;
threshold detector means connected to the output of said full wave rectifier and providing a shut down signal when the voltage signal applied thereto exceeds a predetermined level.

9. A servo controller as claimed in claim 6 wherein:
each primary winding has sufficient inductance to limit the possible rate of current rise so that said current limiting means has sufficient time to cause said first pair of transistors and said second pair of transistors to turn off before destructive current flows therethrough.

10. A servo controller having a switching output for supplying a load comprising:
a plurality of pairs of switching devices each pair connected between a voltage source and a common;
a plurality of transformers each associated with one pair of switching devices and each having a primary winding, connected between the associated pair of switching devices, and a secondary winding, coupled to the primary winding;
a connection to the load located between each pair of switching devices;
current limiting means connected to the secondary winding of each of said plurality of transformers for turning all of said plurality of pairs of switching devices off when the voltage level in any of the secondary windings, exceeds a predetermined level.

11. A servo controller as claimed in claim 10 comprising
a plurality of pairs of diodes, each pair of diodes associated with a pair of switching devices with one of the diodes connected from the common across one of the switching devices and the primary winding and the other diode connected from the voltage source across the other switching device and the primary winding.

12. A servo controller as claimed in claim 10 wherein:
the inductance of each primary winding is high enough to limit current rise to a rate which enables said current limiting means to turn off all of said switching devices before destructive current flows therethrough.

* * * * *

UNITED STATES PATENT AND TRADEMARK OFFICE
CERTIFICATE OF CORRECTION

PATENT NO. : 4,270,164

DATED : May 26, 1981

INVENTOR(S) : Kenneth R. Wyman; Gerard A. Gallagher

It is certified that error appears in the above-identified patent and that said Letters Patent are hereby corrected as shown below:

Col. 6, line 57, delete "introduced" and substitute therefor --interposed--.

Signed and Sealed this

Fifteenth Day of September 1981

[SEAL]

Attest:

GERALD J. MOSSINGHOFF

Attesting Officer

Commissioner of Patents and Trademarks